J. A. ADAMS.
Machine for Electrotyping.
No. 13,516.
2 Sheets—Sheet 1.
Patented Sept. 4, 1855.
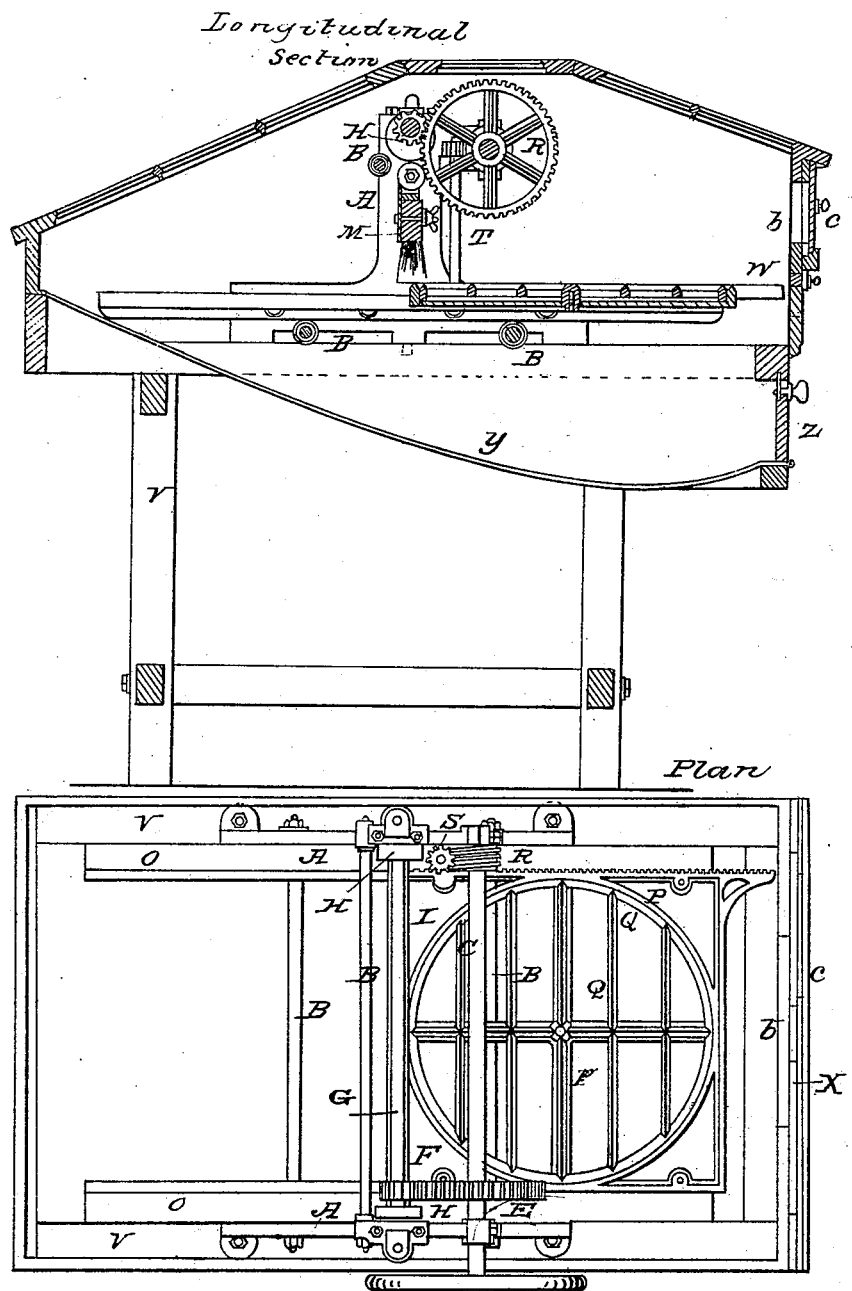

J. A. ADAMS.
Machine for Electrotyping.
No. 13,516.
2 Sheets—Sheet 2.
Patented Sept. 4, 1855.
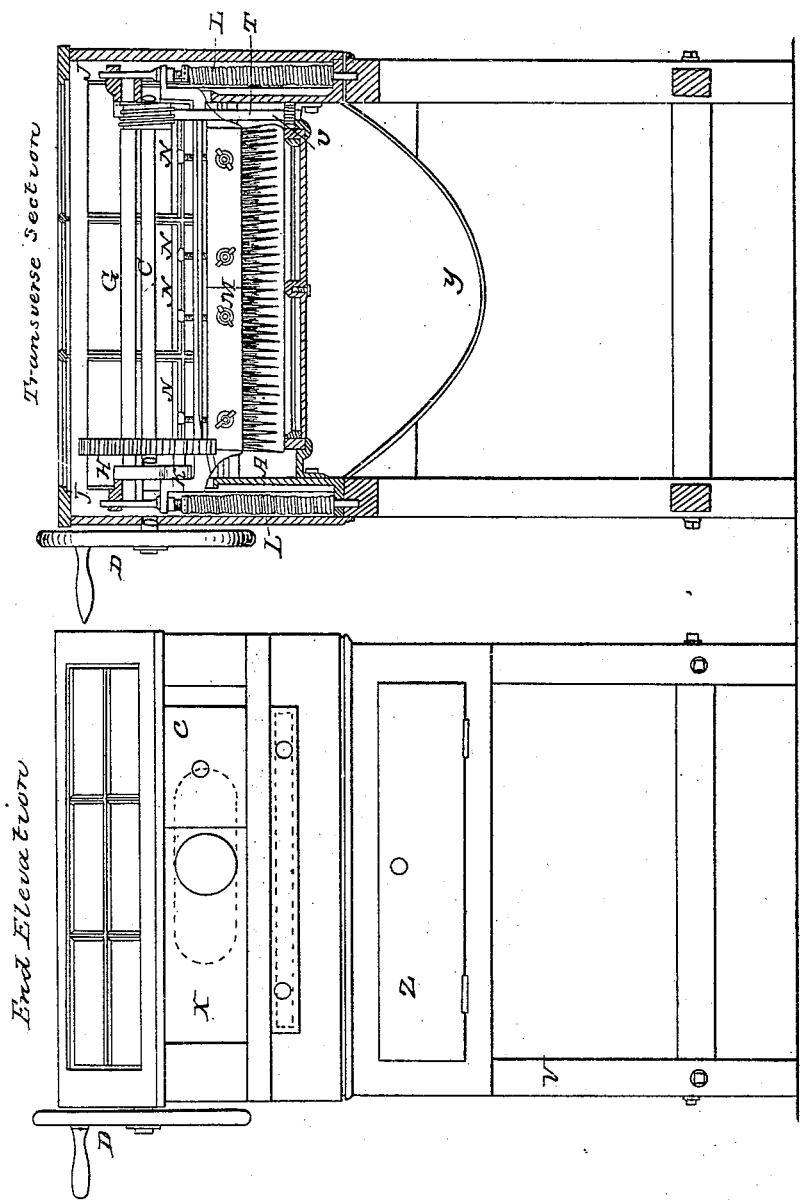
WITNESSES
H. Skidmore
James S. Diach
INVENTOR
J. A. Adams

UNITED STATES PATENT OFFICE.

JOSEPH A. ADAMS, OF BROOKLYN, NEW YORK.

IMPROVED MACHINE FOR ELECTROTYPING.

Specification forming part of Letters Patent No. 13,516, dated September 4, 1855.

*To all whom it may concern:*

Be it known that I, JOSEPH ALEXANDER ADAMS, engraver on wood, at present residing in the city of Brooklyn, Long Island, and State of New York, have invented a new and useful Machine for Coating Molds with the Powder of Plumbago or any other Powdered Substance for Electrotyping Purposes; and I do hereby declare that the following is a full and exact description thereof, reference being had to the accompanying drawings, and to the letters of reference marked thereon.

A A are the side frames of the machine, which are connected together by the three stretchers B B B.

C is the driving-shaft, which is turned by a handle on one of the arms of the fly-wheel D. On said shaft is fixed the toothed wheel E, which gears into the pinion F on the pinion-shaft G. Two eccentrics, H H, are also fixed on this pinion-shaft. Directly under this shaft G and parallel with it is the bar I, which runs across the machine through openings in the side frames, A A, and is screwed fast to the vertical guide-rods J J, which rods run through bearings in projections on the outside of the side frames. On the top side of the bar I and directly under the eccentrics H H are two friction-rollers K K, which are always kept in contact with the eccentrics by the elasticity of the adjustable spiral springs L L under the ends of the bar I on the vertical guide-rods J J. Under this bar I and to a flange on the side of it is fixed a brush, M, made of badgers' or other fine hair. This brush is about one and a half inch wide and long enough to extend over the largest mold to be coated in the machine, and can be set to any distance below the bar I by the set or thumb screws N N N. Now, by turning the fly-wheel D the pinion-shaft G and eccentrics H H will also revolve, and thus give a vertical vibrating motion to the bar I and brush M. Below this brush and running horizontally on the guide-rails O O is a grated or open-work sliding carriage, P, with a large turn-table, Q, in the center, on which the mold to be operated on is placed. This carriage receives its motion by the worm R on the driving-shaft C working into and turning the worm-wheel S, fixed on the upper end of the upright shaft T. On the lower end of this shaft is fixed the pinion U, which gears into the rack-teeth on the side of the sliding carriage P. The use of the turn-table Q is for the purpose of more easily changing the position of the mold. Thus it will be seen that turning the fly D not only causes the brush M to rise and fall, but also causes the carriage and mold to run backward or forward under said brush, according to the direction in which the fly-wheel is turned.

The machine stands on a frame, V, and is inclosed in a wood and glass case, so as to prevent the powdered plumbago from escaping and still permit the operator to see the work within. The case has a covered aperture, W, at one end, for the purpose of putting in the mold to be operated on and removing it from the turn-table Q, and also an opening, b, covered with a long slide, X. This long slide has a circular hand-hole and cover, c, and slides in front of the opening b, for the convenience of turning the turn-table and mold, putting on the plumbago, adjusting the brush, &c. Under the machine is stretched an apron, Y, of any suitable material, for the purpose of receiving the plumbago that falls from the mold and machine, and at one end is a door, Z, for removing it.

Operation of the machine: The sliding carriage P being at the front end of the machine, the mold to be coated with the material is placed indented side upward on the turn-table Q through the aperture in front of the case, and the powdered plumbago is sprinkled over it by passing the hand through the hand-hole b in the long slide X. The apertures are then closed and the machine put in operation by turning the fly-wheel D. As the brush M vibrates, the sliding carriage P and mold move slowly under the brush M at the rate of about one-eighth of an inch to every stroke of the said brush. When the mold has thus entirely passed under the brush M, the operator reverses the motion of the fly-wheel D, and consequently of the machine, and the mold repasses under the brush M in a contrary direction. The turn-table Q and mold are then turned at right angles to their former position and again passed forward and backward under the vibrating brush M, as before, and the mold is sufficiently coated for all ordinary work. Now, as the mold advances at the same time that the brush M descends, it is evident that the advancing sides of the indentations of the mold must be acted upon more efficiently by the brush M, and thus be better coated than in case the mold remained stationary. By the operation above described each of the four sides of the mold is in turn the advancing side. Thus all the sides, as also the bottoms of the indentations and tops of the projections of the mold, are acted upon by the brush M. By this means a mold can be coated much quicker and more equally than by hand.

I claim—

The reciprocating or vibrating brush M, operated as shown, or in an equivalent way, for the purpose of covering or coating the molds for electrotyping purposes with any proper powdered substance, the said vibrating brush being combined, when necessary, with a carriage, P, arranged as shown, or in an equivalent way, so that the whole surface of the molds may be presented gradually or successively to the action of the brush as the molds pass underneath it.

J. A. ADAMS.

Witnesses:
H. SKIDMORE,
JAMES S. DIACK.